US011126158B2

(12) United States Patent
Saitou

(10) Patent No.: US 11,126,158 B2
(45) Date of Patent: Sep. 21, 2021

(54) NUMERICAL CONTROLLER AND CAD/CAM-CNC INTEGRATED SYSTEM

(71) Applicant: FANUC CORPORATION, Yamanashi (JP)

(72) Inventor: Kiwamu Saitou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/906,482

(22) Filed: Feb. 27, 2018

(65) Prior Publication Data
US 2018/0259935 A1    Sep. 13, 2018

(30) Foreign Application Priority Data

Mar. 10, 2017    (JP) .............................. JP2017-045974

(51) Int. Cl.
*G05B 19/4097*    (2006.01)
*G05B 19/18*    (2006.01)

(52) U.S. Cl.
CPC ....... *G05B 19/4097* (2013.01); *G05B 19/182* (2013.01); *G05B 2219/37441* (2013.01); *Y02P 90/02* (2015.11)

(58) Field of Classification Search
CPC .............. G05B 19/4097; G05B 19/182; G05B 2219/37441; G05B 19/4069; G05B 19/40937; Y02P 90/265
(Continued)

(56) References Cited

U.S. PATENT DOCUMENTS 5,757,648 A    5/1998 Nakamura
6,535,788 B1    3/2003 Yoshida et al.
(Continued)

FOREIGN PATENT DOCUMENTS

JP    H01226004 A    9/1989
JP    546228 A    2/1993
(Continued)

OTHER PUBLICATIONS

Liang, S.Y., Hecker, R.L. and Landers, R.G., 2002, January. Machining process monitoring and control: the state-of-the-art. In ASME 2002 International Mechanical Engineering Congress and Exposition (pp. 599-610). American Society of Mechanical Engineers. (Year: 2002).*

(Continued)

*Primary Examiner* — Rocio Del Mar Perez-Velez
*Assistant Examiner* — Alicia M. Choi
(74) *Attorney, Agent, or Firm* — RatnerPrestia

(57) ABSTRACT

There is provided a numerical controller capable of automatic selection of a function appropriate for a machining request and optimization of parameters, and a CAD/CAM-CNC integrated system. The numerical controller includes: a shared database storing machining resource information about the numerical controller and a machine tool; and machining instruction information including machining content information created by CAD and CAM and machining request information about a request required for machining; a machining instruction deciphering portion deciphering the machining instruction information; and a machining instruction executing portion executing the machining based on a result of decipherment by the machining instruction deciphering portion; and the machining instruction deciphering portion executes at least one of a process for judging whether the machining is possible or not based on the machining instruction information and the machining resource information, a process for deciding parameters for the machining and a process for automatically selecting a function to be used for the machining.

8 Claims, 12 Drawing Sheets

(58) Field of Classification Search
USPC .......................................................... 700/174
See application file for complete search history.

(56) References Cited

U.S. PATENT DOCUMENTS

| | | | |
|---|---|---|---|
| 6,591,156 B1 | 7/2003 | Fukaya et al. | |
| 9,618,926 B1* | 4/2017 | Louette | G05B 19/18 |
| 2002/0116504 A1* | 8/2002 | Preis | G05B 19/0426 |
| | | | 709/227 |
| 2003/0045964 A1* | 3/2003 | Lottgen | G05B 19/409 |
| | | | 700/180 |
| 2004/0143362 A1* | 7/2004 | Matthews | G05B 19/4097 |
| | | | 700/182 |
| 2004/0190055 A1* | 9/2004 | Takamatsu | G06F 3/1241 |
| | | | 358/1.15 |
| 2005/0055323 A1 | 3/2005 | Zetek et al. | |
| 2005/0154625 A1* | 7/2005 | Chua | G06Q 10/06 |
| | | | 700/100 |
| 2005/0171629 A1* | 8/2005 | Suh | G05B 19/4093 |
| | | | 700/159 |
| 2007/0005170 A1* | 1/2007 | Schedel | G05B 19/41865 |
| | | | 700/101 |
| 2014/0103014 A1* | 4/2014 | Arakawa | B23H 1/022 |
| | | | 219/69.12 |
| 2015/0039122 A1* | 2/2015 | Barakchi Fard | G06F 17/5009 |
| | | | 700/186 |
| 2015/0212516 A1* | 7/2015 | De Schepper | G05B 19/4097 |
| | | | 700/182 |
| 2016/0202688 A1 | 7/2016 | Ogawa et al. | |
| 2016/0346853 A1 | 12/2016 | Tuboguchi | |
| 2017/0227945 A1* | 8/2017 | Wang | G05B 19/182 |
| 2017/0308057 A1* | 10/2017 | Kreidler | G05B 19/4069 |
| 2018/0314227 A1* | 11/2018 | Bretschneider | G05B 19/4083 |
| 2019/0018391 A1* | 1/2019 | Rogers | G05B 19/4097 |
| 2019/0030582 A1* | 1/2019 | Olsson | G05B 19/40938 |

FOREIGN PATENT DOCUMENTS

| | | |
|---|---|---|
| JP | H05313729 A | 11/1993 |
| JP | 200084794 A | 3/2000 |
| JP | 2001001151 A | 1/2001 |
| JP | 200953736 A | 3/2009 |
| JP | 201086553 A | 4/2010 |
| JP | 2012190113 A | 10/2012 |
| JP | 2016130908 A | 7/2016 |
| JP | 2016224642 A | 12/2016 |
| WO | 9810890 A1 | 3/1998 |
| WO | 0038881 A1 | 7/2000 |

OTHER PUBLICATIONS

Notification of Reasons for Refusal for Japanese Application No. 2017-045974, dated Sep. 4, 2018, with translation, 20 pages.
Decision to Grant a Patent for Japanese Application No. 2017-045974, dated Feb. 5, 2019, with translation, 5 pages.

* cited by examiner

FIG.5

| PURPOSE | FUNCTION | PRIORITY ORDER | FUNCTION NOT USABLE TOGETHER | RELATED PARAMETER |
|---|---|---|---|---|
| IMPROVEMENT OF MACHINING SPEED | HIGH-SPEED CONTOUR CONTROL | 1 | - | - |
| IMPROVEMENT OF SURFACE QUALITY (GROUP A) | SMOOTHING FUNCTION A | 1 | FUNCTION IN THE SAME GROUP FAITHFULLY IN ACCORDANCE WITH SPECIFIED SHAPE | MAGNITUDE OF TOLERANCE |
| | SMOOTHING FUNCTION B | 2 | | |
| | SMOOTHING FUNCTION C | 3 | | |
| IMPROVEMENT OF SURFACE QUALITY (GROUP B) | ACCELERATION/DECELERATION CONTROL A | 1 | FUNCTION IN THE SAME GROUP FAITHFULLY IN ACCORDANCE WITH SPECIFIED SHAPE | ACCELERATION/ DECELERATION OF MOTOR |
| | ACCELERATION/DECELERATION CONTROL B | 2 | | |
| FAITHFULLY IN ACCORDANCE WITH SPECIFIED SHAPE | EXACT STOP | 1 | IMPROVEMENT OF SURFACE QUALITY | MAGNITUDE OF TOLERANCE |

FIG.6

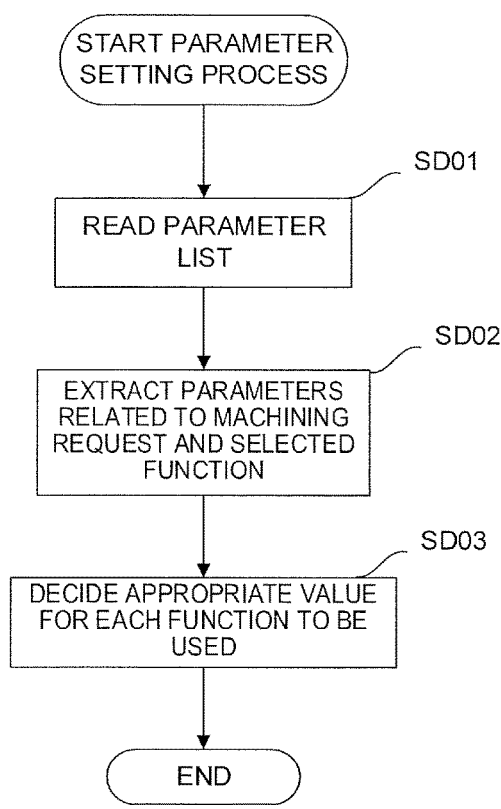

FIG.7

| MACHINING REQUEST INFORMATION MACHINING CONTENT INFORMATION | PARAMETER | / APPROPRIATE VALUE |
|---|---|---|
| PRIORITIZE MACHINING ACCURACY | ACCELERATION/DECELERATION OF MOTOR OF FEED AXIS<br>MAGNITUDE OF TOLERANCE | / LOW<br>/ SMALL |
| PRIORITIZE MACHINING TIME | ACCELERATION/DECELERATION OF MOTOR OF FEED AXIS<br>MAGNITUDE OF TOLERANCE | / HIGH<br>/ LARGE |
| ENERGY-SAVING MACHINING | ACCELERATION/DECELERATION OF MOTOR OF MAIN AXIS | / LOW |
| MASS OF WORK PIECE | FAST FEED RATE<br>FEED ACCELERATION | /EXPRESSED BY FUNCTION OF WEIGHT<br>/EXPRESSED BY FUNCTION OF WEIGHT |

NUMERICAL CONTROLLER AND CAD/CAM-CNC INTEGRATED SYSTEM

CROSS-REFERENCE TO RELATED APPLICATIONS

This application is a new U.S. Patent Application that claims benefit of Japanese Patent Application No. 2017-045974, filed Mar. 10, 2017, the disclosure of this application is being incorporated herein by reference in its entirety for all purposes.

BACKGROUND OF THE INVENTION

1. Field of the Invention

The present invention relates to a numerical controller and a CAD/CAM-CNC integrated system.

2. Description of the Related Art

At the time of manufacturing a product, design information including shape data is created using CAD, and machining instruction information is created by CAM based on the created design information. Then, based on the created machining instruction information, a numerical controller (a CNC or a CNC apparatus) controls a machine tool for machining a work piece to manufacture the product.

The machining instruction information created by CAM includes information showing content of machining (shown by a machining program, axis movement route data and the like), and the numerical controller controls the machine tool in accordance with the machining instruction information outputted by CAM to perform the machining. The machining instruction information outputted from CAM, however, does not include a part of information required for the machining, such as information about which of functions provided for the numerical controller and the machine tool is to be used to perform the machining included in the machining instruction information and information about which machining condition should be set at the time of using the function.

In current machining using a numerical controller, an operator who performs the machining using machining instruction information decides a function to be used for the machining, selects a numerical controller and a machine tool provided with the function, and adds other necessary information (information not included in the machining instruction information) to a machining program to make an instruction.

As a conventional technique related to the flow of the machining using CAD/CAM described above, for example, Japanese Patent Laid-Open No. H05-046228 discloses a technique in which specification information data for a machining program of a numerical controller is transferred to an automatic programming apparatus, and post-processor data is automatically set/changed. Further, Japanese Patent Laid-Open No. 2016-130908 discloses an automatic parameter adjustment apparatus which quantitatively sets an importance degree of each of machining time and machining accuracy and performs parameter adjustment according to a machining condition. Furthermore, Japanese Patent Laid-Open No. 2009-053736 discloses a prior-art technique about a numerical controller which reads a machining instruction and judges whether the machining can be actually executed by a machine.

In general, since knowledge and experience of numerical controllers and machine tools are required for decision of a function appropriate for machining, selection of a numerical controller and a machine tool and setting of other necessary information, there is a possibility that an inexperienced operator cannot perform appropriate decision of a function, selection of a numerical controller and a machine tool, and setting of other necessary information and cannot sufficiently utilize performances of numerical controllers and machine tools.

In the techniques disclosed in Japanese Patent Laid-Open No. H05-046228, Japanese Patent Laid-Open No. 2016-130908 and Japanese Patent Laid-Open No. 2009-053736 described above, a part of the above problem can be solved by performing automatic setting of machining parameters and the like. However, the techniques disclosed in Japanese Patent Laid-Open No. H05-046228, Japanese Patent Laid-Open No. 2016-130908 and Japanese Patent Laid-Open No. 2009-053736 described above are not techniques for deciding which function is to be used according to content of machining, and a technique for setting and parameter adjustment in consideration of functions which numerical controllers and machine tools are provided with is not disclosed. Therefore, in these conventional techniques, the problem still remains that it is not possible to sufficiently utilize functions which each of numerical controllers and machine tools is provided with in order to realize specified machining.

SUMMARY OF THE INVENTION

Therefore, an object of the present invention is to provide a numerical controller capable of automatic selection of a function appropriate for a machining request and optimization of parameters, and a CAD/CAM-CNC integrated system.

The numerical controller and the CAD/CAM-CNC integrated system of the present invention are provided with a shared database which is accessible from the CAD/CAM and the numerical controller in common. Machining resource information about a numerical controller and a machine tool under the control of the CAD/CAM-CNC integrated system is stored in the shared database. At the time of deciphering machining instruction information, the numerical controller refers to the machining resource information stored in the shared database, and automatically performs selection of a function to be used for machining and setting of optimal parameters.

One aspect of the present invention is a numerical controller connected to a shared database, the numerical controller controlling a machine tool, wherein the shared database stores: machining resource information about the numerical controller and the machine tool; and machining instruction information including machining content information about content of machining created by CAD and CAM and machining request information about at least one request required for the machining; the numerical controller comprises a machining instruction deciphering portion deciphering the machining instruction information and a machining instruction executing portion executing the machining based on a result of decipherment by the machining instruction deciphering portion; and the machining instruction deciphering portion executes at least one of a process for judging whether the machining by the machine tool according to the machining instruction information is possible or not, based on the machining instruction information and the machining resource information that are stored in the shared database, a process for deciding parameters for the machining and a process for automatically selecting a function to be used for the machining among functions provided for the numerical controller and the machine tool.

Further, another aspect of the present invention is a CAD/CAM-CNC integrated system comprising a shared database, a machining instruction deciphering portion and at least one numerical controller controlling a machine tool, wherein the shared database stores: machining resource information about the numerical controller and the machine tool; and machining instruction information including machining content information about content of machining created by CAD and CAM and machining request information about at least one request required for the machining; the machining instruction deciphering portion deciphers the machining instruction information and executes at least one of a process for judging whether the machining by the machine tool according to the machining instruction information is possible or not, based on the machining instruction information and the machining resource information that are stored in the shared database, a process for deciding parameters for the machining and a process for automatically selecting a function to be used for the machining among functions provided for the numerical controller and the machine tool; and the numerical controller comprises a machining instruction executing portion executing the machining based on a result of decipherment by the machining instruction deciphering portion.

According to the present invention, by a numerical controller performing automatic selection of a function and optimization of parameters appropriate for a machining request, it becomes possible to perform appropriate machining even in the case of an NC program created by a worker who is not familiar with functions mounted on the numerical control machining machine. Further, by the numerical controller performing selection of a function to be used and setting of parameters, it becomes possible to execute the same NC program on a plurality of machine tools mounted with different functions, and, thereby, versatility of the NC program is improved.

BRIEF DESCRIPTION OF THE DRAWINGS

The above and other objects and features of the present invention will be apparent from description of embodiments below with reference to accompanying drawings. Among the drawings:

FIG. 5 is a diagram showing function list information;

FIG. 6 is a schematic flowchart showing a form of a parameter setting process;

FIG. 7 is a diagram showing parameter setting list information;

DETAILED DESCRIPTION OF THE PREFERRED EMBODIMENTS

A configuration example of a CAD/CAM-CNC integrated system for realizing the present invention will be shown below.

The configuration of the CAD/CAM-CNC integrated system of the present invention, however, is not limited to the example below, and any configuration may be adopted if the configuration can realize an object of the present invention.

Figure 1:
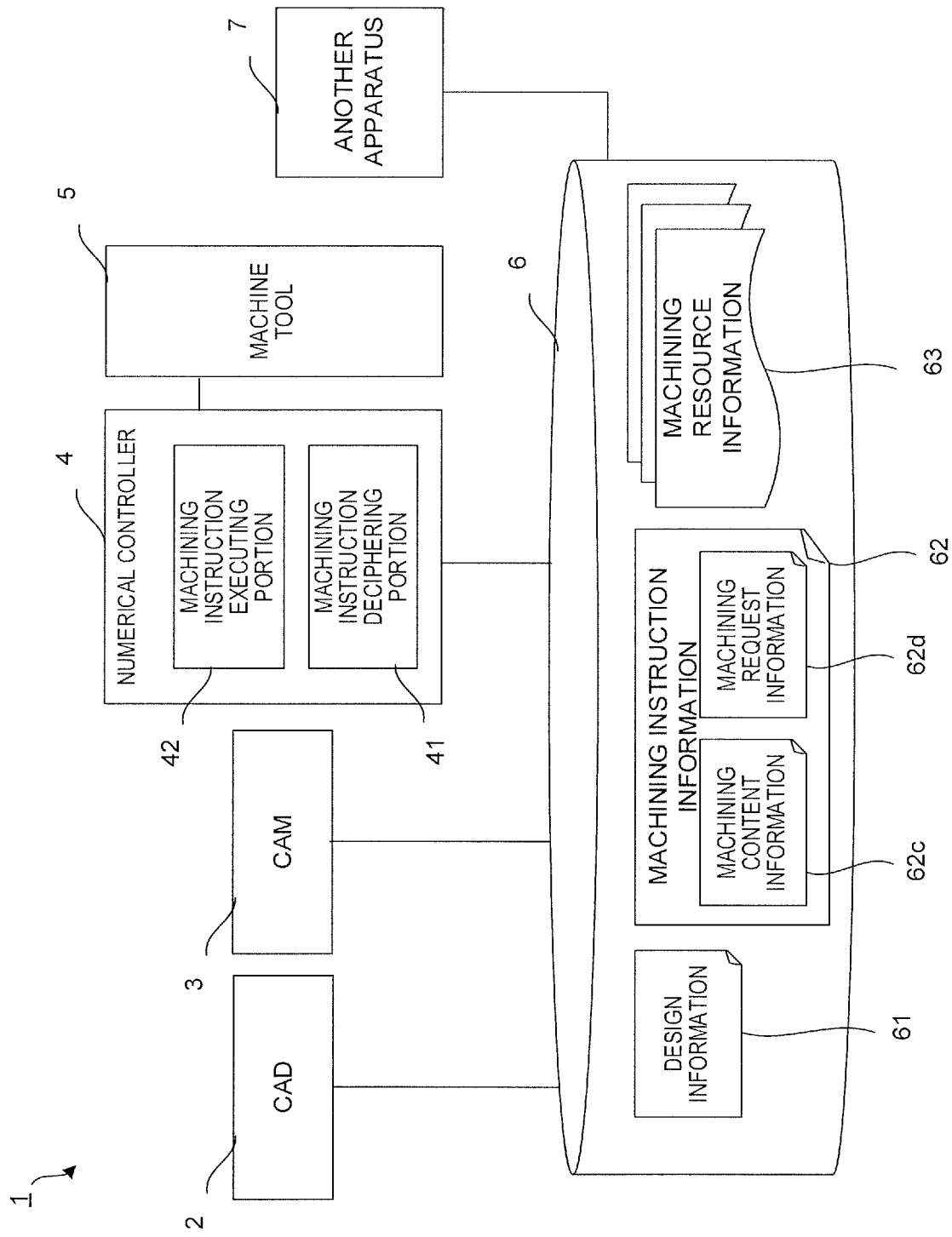
FIG. 1 is a schematic functional block diagram of a CAD/CAM-CNC integrated system according to a first embodiment.

FIG. 1 is a diagram showing a schematic configuration of a CAD/CAM-CNC integrated system 1 according to a first embodiment. The CAD/CAM-CNC integrated system 1 according to the present embodiment is provided with a CAD apparatus 2, a CAM apparatus 3, a numerical controller 4, a machine tool 5 and a shared database device 6. Each of the CAD apparatus 2, the CAM apparatus 3 and the numerical controller 4 is connected to the shared database device 6 so that it is possible to access the shared database device 6 to write/read information. In addition to the CAD apparatus 2, the CAM apparatus 3 and the numerical controller 4, another apparatus 7 used in a process of design or manufacture of a product (including an apparatus on which software used in the process of manufacture is operating) may be connected to the shared database device 6 so that access from the other apparatus 7 to write/read information is possible. One CAD apparatus 2, one CAM apparatus 3, one numerical controller 4, one machine tool 5 and another apparatus 7 are shown in FIG. 1 to simplify description. Actually, however, a plurality of CAD apparatuses 2, CAM apparatuses 3, numerical controllers 4, machine tools 5 and other apparatuses 7 may be under the control of the CAD/CAM-CNC integrated system 1, and each of them may be capable of accessing the shared database device 6 to write/read information.

The shared database device 6 may be included in the numerical controller 4, or may be connected as a peripheral device of the numerical controller 4, or may be communicably connected to the numerical controller 4 via a wired or wireless network. Further, the shared database device 6 is not required to be configured with one information storage device but may be configured with a plurality of information storage apparatuses.

As examples of the other apparatus 7 capable of accessing the shared database device 6, the following are given. However, it is not necessary that all the following are prepared as components of the CAD/CAM-CNC integrated system 1.

(An apparatus on which) information management software for information management of the shared database device 6 (is operating)

(An apparatus on which) software for management of processes such as order acceptance, production and shipment (is operating)

(An apparatus on which) software for quality management of products (is operating)

A measurement device for collecting information during machining

A measurement device for measuring a work piece

A measurement device for management of machining resources (An apparatus provided with) a user interface making it possible to perform at least manual input or output of information to or from the shared database device 6

Other devices which use or generate information related to designing and machining of a product As examples of the measurement device for collecting information during machining, a voltmeter, an ampere meter, a thermometer, an accelerometer, a vibrometer, a displacement meter, a microphone, a camera, a manometer or a flow meter for air or liquid and a pH meter are given. These measurement devices may be connected to the shared database device 6 either via the numerical controller 4 or not via the numerical controller 4.

As examples of the measurement device for measuring a work piece, a touch probe, a three-dimensional measurement instrument, a shape measurement instrument for measuring plane roughness or geometrical tolerance, an optical inspection device and an internal structure inspection device using ultrasonic waves or radiation are given. These measurement devices may be connected to the shared database device 6 either via the numerical controller 4 or not via the numerical controller 4.

As examples of the measurement device for management of machining resources, a tool length measurement instrument, a tool diameter measurement instrument and a tool vibration detector are given. These measurement devices may be connected to the shared database device 6 either via the numerical controller 4 or not via the numerical controller 4.

Machining resource information 63 is stored in the shared database device 6. The machining resource information 63 is information about a function and performance of each of the numerical controller 4 and machine tool 5 under the control of the CAD/CAM-CNC integrated system 1 and is referred to when the numerical controller 4 deciphers machining instruction information 62 outputted by the CAM apparatus 3.

As examples of the machining resource information 63, the following are given. However, it is not necessary that all the following information items are prepared as the machining resource information 63 stored in the shared database device 6.

Information about classifications of the numerical controller 4 and the machine tool 5

Information about axis configurations of the numerical controller 4 and the machine tool 5

Information about a stroke or feed rate of each feed axis of the numerical controller 4 and the machine tool 5

Information about machining capabilities of the numerical controller 4 and the machine tool 5

Information about a maximum size or maximum mass of a work piece which can be set on the machine tool 5

Information about a tool mounted on the machine tool 5

Information about auxiliary devices mounted on the numerical controller 4 and the machine tool 5

Information about functions which the numerical controller 4 and the machine tool 5 can use Information about parameters for the numerical controller 4 and the machine tool 5

Information about static accuracy or dynamic accuracy of the numerical controller 4 and the machine tool 5

Information about current states of the numerical controller 4 and the machine tool 5

As examples of the information about machining capabilities of the numerical controller 4 and the machine tool 5, information about output or the maximum number of rotations of a main axis is given if the machine tool 5 is a cutting machine or a grinding machine, and information about applied voltage or current is given if the machine tool 5 is a machine for electric discharge machining. Further, if the machine tool 5 is a machine for laser machining or water jet machining, information about laser output or water pressure is given as an example. If the machine tool 5 is an injection molding machine, information about heating temperature or injection pressure is given as an example.

As for the information about the maximum size or maximum mass of a work piece which can be set on the machine tool 5, if the work piece is attached to the machine tool 5 via a jig or an additional axis table, a size or mass including the size or mass of the intervening thing may be adopted.

As examples of the information about a tool mounted on the machine tool 5, information about a shape of the mounted tool, information about material of the tool, information about a machining condition of the tool, information about time of use, information about a life and information about abrasion and breakage are given.

As examples of the Information about auxiliary devices of mounted on the numerical controller 4 and the machine tool 5, information about a cutting-fluid-related device, information about an air-equipment-related device, information about a device for clamping a work piece, information about a device for automatic supply of a work piece, information about a device for automatic measurement of a work piece and information about a device related to automatic discharge of chips and the like are given.

As examples of the information about current states of the numerical controller 4 and the machine tool 5, information about hours of operation and information about a maintenance interval are given.

The information about static accuracy or dynamic accuracy of the numerical controller 4 and the machine tool 5 may be updated each time an inspection is performed.

Design information 61 created by the CAD apparatus 2 is stored in the shared database device 6. Further, in the shared database device 6, machining instruction information 62 including machining content information 62c about content of machining created by the CAM apparatus 3 with the design information 61 as an input, and machining request information 62d about at least one request for the machining is stored in a form which can be deciphered by the numerical controller 4.

As examples of the machining content information 62c, the following are given. However, it is not necessary that all the following information items are included as the machining content information 62c which the machining instruction information 62 includes.

Information about a shape of a machined work piece

Information about a machining method

Information about a machining route

Information about a machining condition

Information about a tool to be used for machining

Information about a size or mass of a machined work piece or unmachined material As an example of the information about a machining condition, information about feed rate and the number of rotations of a main axis is given if the machine tool 5 is a cutting machine or a grinding machine, and information about feed rate, and applied voltage or applied current is given if the machine tool 5 is a machine for electric discharge machining. Further, if the machine tool 5 is a machine for laser machining or water jet machining, information about feed rate, and laser output or water pressure is given as an example. If the machine tool 5 is an injection molding machine, information about heating temperature or injection pressure is given as an example.

As examples of the machining request information 62d, the following are given. However, it is not necessary that all the following information items are included as the machining request information 62d which the machining instruction information 62 includes.

Request information about size tolerance, geometrical tolerance and plane roughness of a machined work piece Request information about a characteristic shape of a machined work piece Request information about time required for machining Request information about costs or energy consumption required for machining As examples of the request information about a characteristic shape of a machined work piece, information about smoothness of a curve or a curved surface and information about sharpness of an edge part are given.

The machining instruction information 62 to be inputted is not required to be one file but may be divided and stored in a plurality of files. A file in which the machining content information 62c is written and a file in which the machining request information 62d is written may be separately read.

The numerical controller 4 has a machining instruction deciphering portion 41 which reads the machining instruction information 62 from the shared database device 6 and deciphers it and a machining instruction executing portion 42 which executes machining based on a result of the decipherment.

At the time of deciphering the machining instruction information 62, the machining instruction deciphering portion 41 refers to the machining resource information 63 of the shared database device 6 and performs at least one of a machining possibility/impossibility judgment process about whether execution according to the machining instruction information 62 is possible on the numerical controller 4 and the machine tool 5, automatic selection of a function to be used in execution according to the machining instruction information 62 and decision of parameters for the numerical controller 4 and the machine tool 5.

Figure 2:
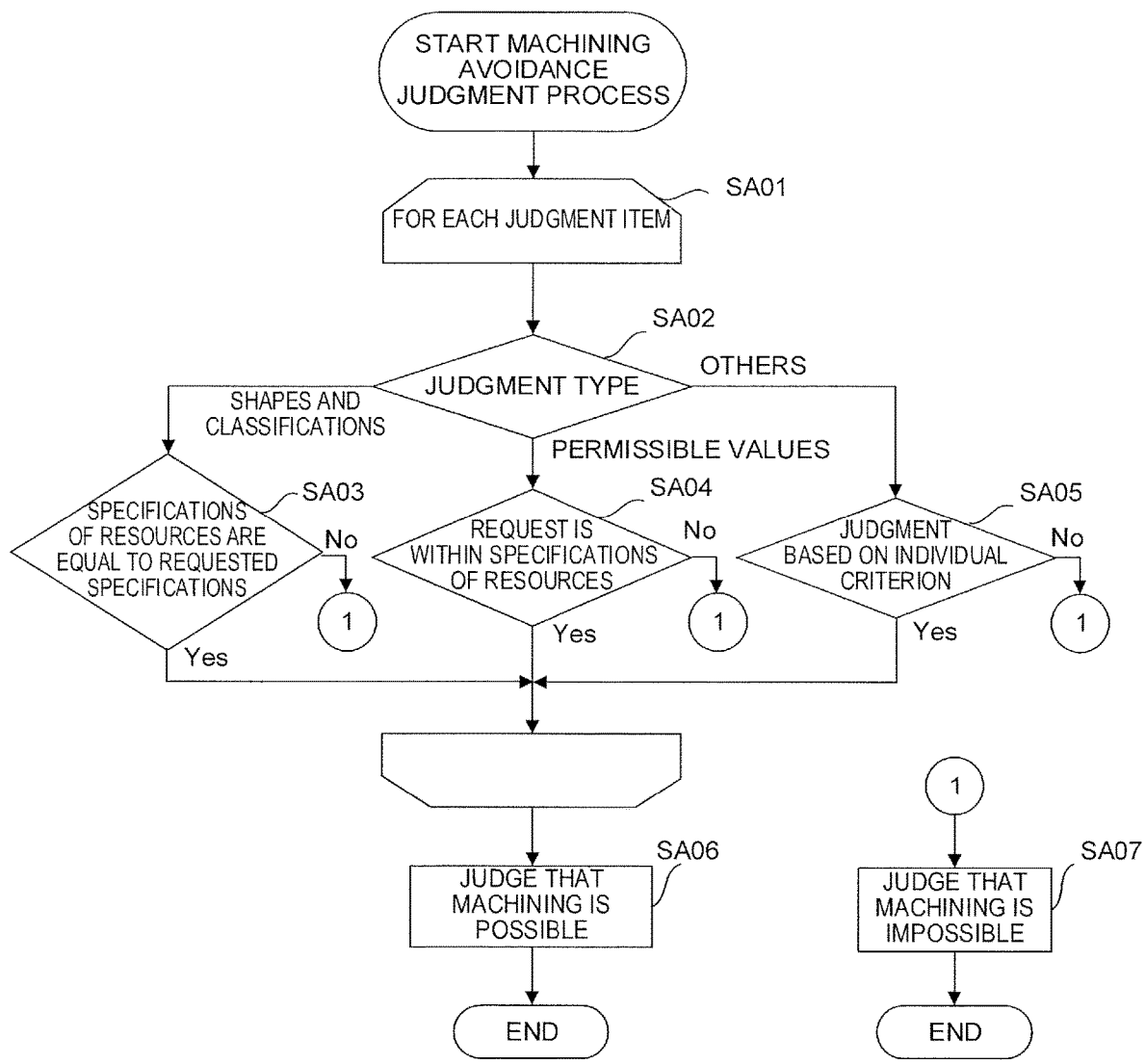
FIG. 2 is a schematic flowchart showing a form of a machining avoidance judgment process.

FIG. 2 is a flowchart showing an example of the machining possibility/impossibility judgment process performed by the machining instruction deciphering portion 41. In the machining possibility/impossibility judgment process, the machining instruction deciphering portion 41 sequentially reads the machining instruction information 62 from the shared database device 6, and judges whether machining is possible or not by judging whether or not the numerical controller 4 and the machine tool 5 satisfy each information item included in the machining content information 62c and each information item included in the machining request information 62d. In this judgment, the machining instruction deciphering portion 41 refers to the machining resource information 63 about the numerical controller 4 and the machine tool 5 stored in the shared database device 6, and makes a judgment about whether a condition is satisfied or not by comparing the machining resource information 63 referred to with each information item in the machining content information 62c and the machining request information 62d (step SA01). Though the machining instruction deciphering portion 41 may make judgments for all the information items included in the machining instruction information 62, the machining instruction deciphering portion 41 may make judgments only for information items specified in a setting file or the like in advance. As types of the judgments, a type of making a judgment based on shapes and classifications of machining resources, a type of making a judgment based on permissible values and a type of making a judgment based on other criteria are conceivable (step SA02).

For an item for which a judgment is to be made based on shapes and classifications, it is judged that a condition is satisfied if requested specifications included in the machining instruction information 62 correspond to machining resource specifications of the numerical controller 4 and the machine tool 5 included in the machining resource information 63. As an example of this case, comparison between specifications of a tool used for machining specified in the machining content information 62c of the machining instruction information 62 with specifications of a tool mounted on the machine tool 5 included in the machining resource information 63 is given (step SA03).

For an item for which a judgment is made based on a permissible value, it is judged that a condition is satisfied if a range of requested specifications included in the machining instruction information 62 is included in a range of machining resource specifications of the numerical controller 4 and the machine tool 5 included in the machining resource information 63. As an examples of this case, comparison between a maximum movement range of each axis included in the machining instruction information 62 with a stroke of each axis of the numerical controller 4 and the machine tool 5 included in the machining resource information 63 is given (step SA04).

For items for which a judgment is to be made based on other criteria, a judgment criterion is set for each judgment item, and a judgment about whether a condition is satisfied is made. As an example of this case, to estimate at least one of size accuracy, geometrical accuracy and machining surface quality expected when machining based on the machining instruction information 62 is executed by the numerical controller 4 and the machine tool 5 using at least one of information about measured static accuracy and information about dynamic accuracy of the machine tool 5, and compare the estimated value with a permissible value of size accuracy, geometrical accuracy or machined surface quality included in the machining instruction information 62 is given (step SA05).

Then, the machining instruction deciphering portion 41 repeats the above judgment process for each information item to be a judgment target. If judging, for all information items to be judgment targets, that conditions are satisfied, the machining instruction deciphering portion 41 judges that the numerical controller 4 and the machine tool 5 can perform machining based on the machining instruction information 62 (step SA06). If there is an information item for which it is judged that a condition is not satisfied, among the information items to be judgment targets, the machining instruction deciphering portion 41 judges that the numerical controller 4 and the machine tool 5 cannot perform machining based on the machining instruction information 62 (step SA07).

Next, examples of a method for selecting a function to be used for machining and a method for setting parameters for the numerical controller 4 and the machine tool 5 will be shown below. However, the methods are not limited to the examples below, and any method is possible if the method is capable of performing selection of a function to be used for machining or setting of parameters based on the machining content information 62c and the machining request information 62*d* included in the machining instruction information 62 and the machining resource information 63 about the numerical controller 4 and the machine tool 5 read from the shared database device 6.

Figure 3:
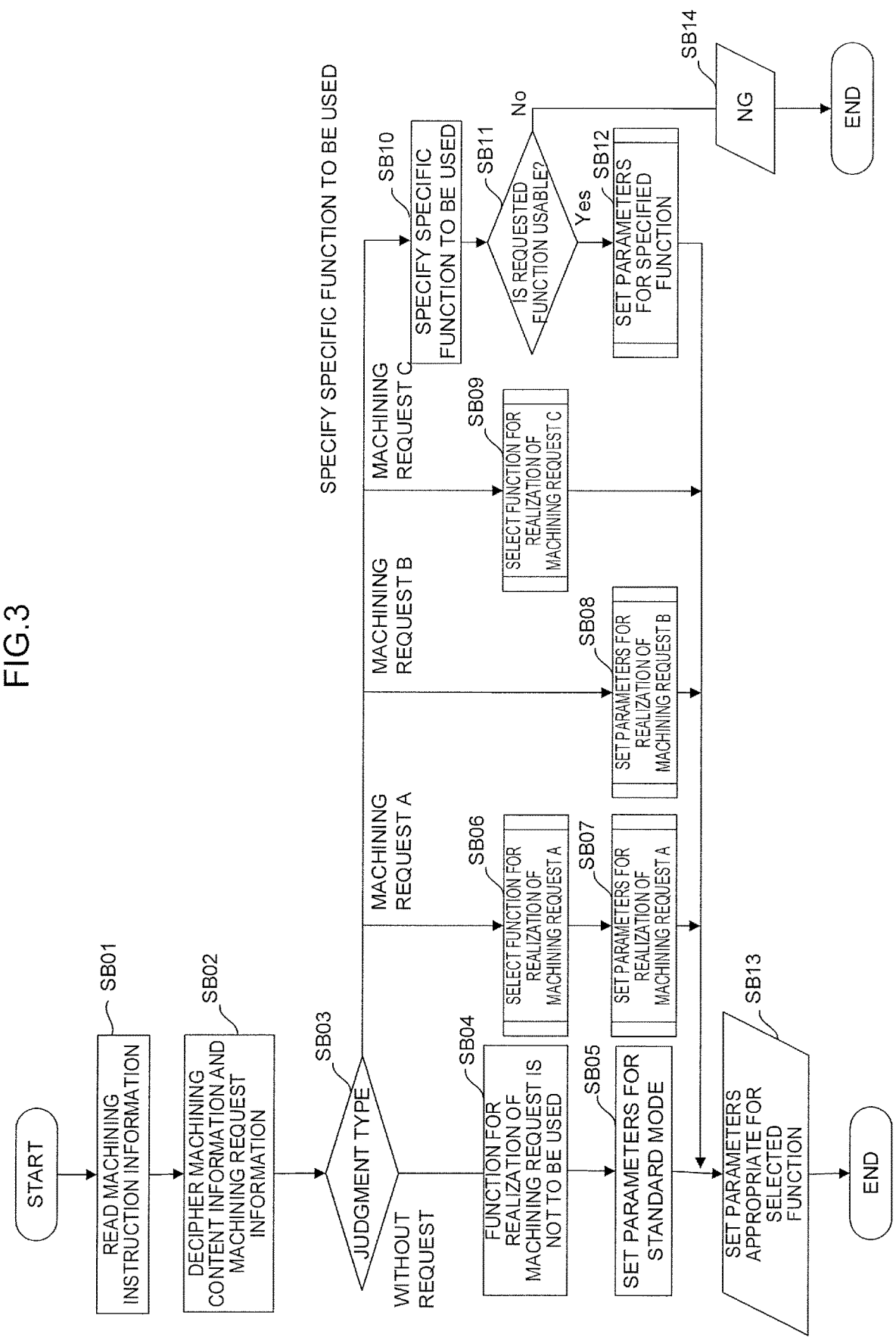
FIG. 3 is a schematic flowchart illustrating a flow of selection of a function and setting of parameters.

FIG. 3 is a flowchart showing an example of a process for performing setting of a function to be used and setting of parameters based on the machining request information 62*d*. When the numerical controller 4 starts reading of the machining instruction information 62 from the shared database device 6 (step SB01), the machining instruction deciphering portion 41 deciphers the machining instruction information 62 and reads the machining content information 62*c* and the machining request information 62*d* included in the machining instruction information 62 (step SB02).

When having read the machining content information 62*c* and the machining request information 62*d*, the machining instruction deciphering portion 41 judges a process to be executed, according to content of information about a request required for machining, which is included in the machining request information 62*d* (step SB03).

If the information about a request required for machining does not exist in the machining request information 62*d*, the machining instruction deciphering portion 41 does not select a function for realizing a request but sets values of a standard machining mode as parameters used for machining (steps SB04 and SB05).

If the information about a request required for machining is included in the machining request information 62*d*, the machining instruction deciphering portion 41 selects a function for realizing the request specified in the machining request information 62*d* (step SB06). Then, after deciding the function to be used for machining, the machining instruction deciphering portion 41 sets parameters related to the decided function to values appropriate for the decided function (steps SB07 and SB13).

Depending on content of the machining request information 62*d* or specifications of the numerical controller 4 and the machine tool 5, the machining instruction deciphering portion 41 may perform only selection of the function for realizing the request, without changing parameters (step SB09) or may only change the parameters without selecting the function for realizing the request (step SB08).

The function to be used for machining may be specifically specified in the machining request information 62*d*. If a specific function is specified in the machining request information 62*d*, the machining instruction deciphering portion 41 refers to the machining resource information 63 about the numerical controller 4 and the machine tool 5 stored in the shared database device 6 and judges whether the specified function can be used on the numerical controller 4 and the machine tool 5. If the specified function can be used on the numerical controller 4 and the machine tool 5, the machining instruction deciphering portion 41 selects the specified function as a function to be used for machining and sets values appropriate for the selected function as parameters for the machines (step SB13). If the specified function cannot be used, the machining instruction deciphering portion 41 terminates the process (steps SB10 to SB12, and SB14).

Figure 4:
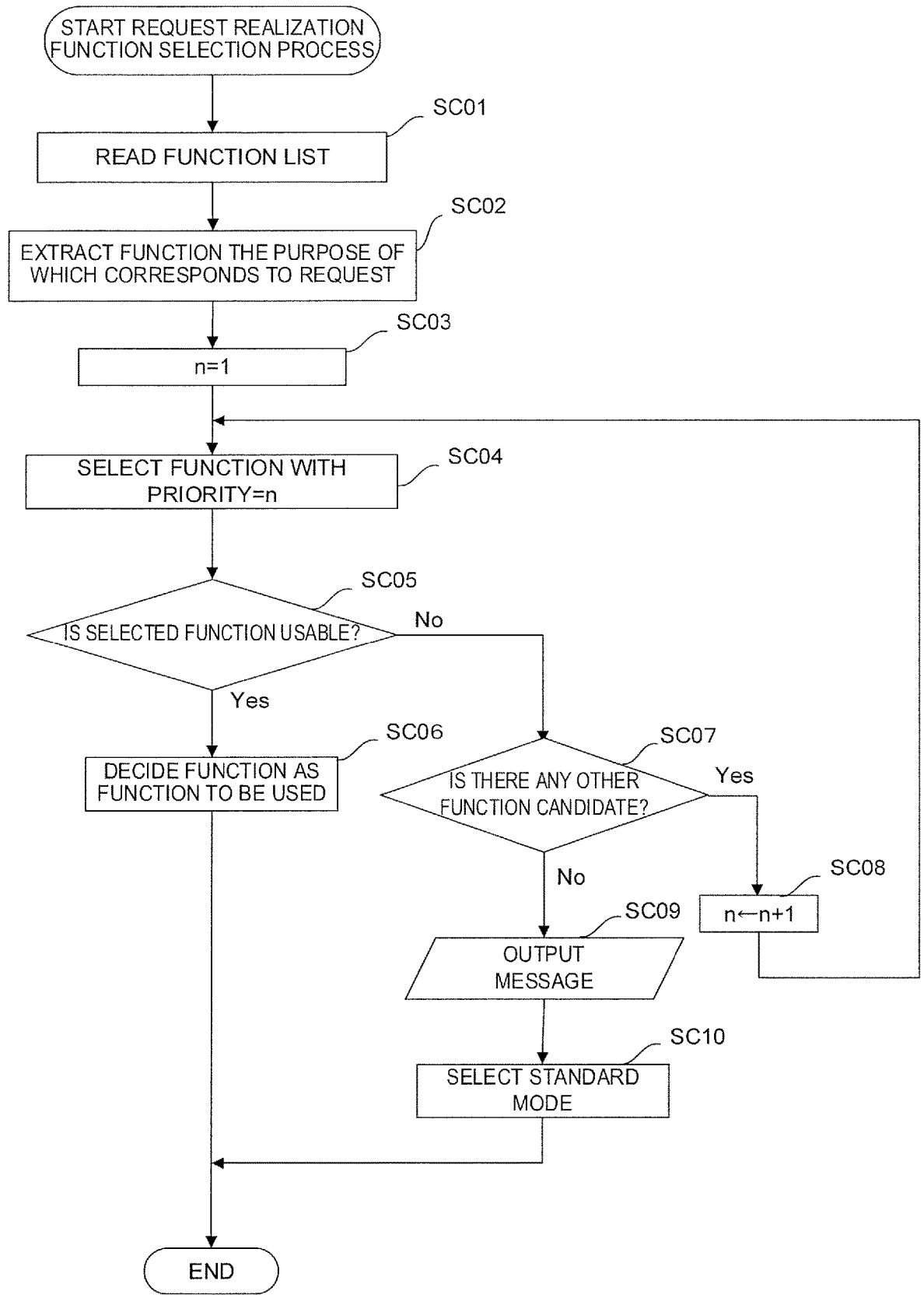
FIG. 4 is a schematic flowchart showing a form of a request realization function selection process.

FIG. 4 is a flowchart showing an example of a process for selecting a function to realize a request. When having read the machining request information 62*d*, the machining instruction deciphering portion 41 reads function list information about functions mounted on the numerical controller 4 and the machine tool 5, which is included in the machining resource information 63, from the shared database device 6 (step SC01), and extracts a function the purpose of which corresponds to realization of the machining request from the read function list information (step SC02). FIG. 5 shows an example of the function list information. In the function list information, a purpose of each of functions mounted on the numerical controller 4 and the machine tool 5, functions which cannot be used together with the function, a parameter related to the function, and the like are recorded. Further, if there are a plurality of functions to be used for the same purpose, among the functions included in the function list information, use priority order may be set for the functions.

Among the functions mounted on the numerical controller 4 and the machine tool 5, there are some functions which are not necessarily usable because of restrictions by content of machining or conflict with other functions. Therefore, the machining instruction deciphering portion 41 selects a function with the highest priority in function selection (step SC04), judges whether the selected function is usable (step SC05), and, if the selected function is usable, decides the function as a function to be used for machining (step SC06). If the function selected at step SC04 cannot be used, the machining instruction deciphering portion 41 judges whether there are other usable functions (step SC07), and, if there are other usable functions, selects a function with the next highest priority and judges whether the function is usable.

If there are not other usable functions, the machining instruction deciphering portion 41 displays a message that there is not an appropriate function (step SC09), and performs machining without using a function for realization of the machining request (step SC10) or stops the process.

In the process shown in FIG. 4, if there are a plurality of pieces of information about requests for functions to be required for machining, in the machining request information 62*d*, and all the functions required to realize the requests can be used together, the plurality of functions may be selected. Further, if there are a plurality of pieces of information about requests for functions to be required for machining, in the machining request information 62*d*, and the functions required to realize the requests cannot be used together, a function for realizing a request with a higher priority may be selected by setting priority order for the requests for the functions required for machining which are included in the machining request information 62*d*. Furthermore, if a plurality of functions can be used together at the same time for information about a request for a function to be required for machining which is included in the machining request information 62*d*, the plurality of functions may be selected as functions to be used.

FIG. 6 is a flowchart showing an example of a process for setting parameters for the numerical controller 4 and the machine tool 5. When having read the machining request information 62*d*, the machining instruction deciphering portion 41 reads parameter setting list information about parameters which can be set for the numerical controller 4 and the machine tool 5, which is included in the machining resource information 63, from the shared database device 6 (step SD01), and extracts related parameters from the read parameter setting list information, based on the machining content information 62*c* and a request for machining included in the machining request information 62*d* (step SD02), and decides appropriate values for the extracted parameters (step SD03).

FIG. 7 is a diagram showing an example of the parameter setting list information. As shown in FIG. 7, the parameter setting list information may be list information in which a request for machining included in the machining request information 62*d*, a related parameter, an appropriate value for the related parameter and a function for deciding the appropriate value are associated. As examples of parameters for the numerical controller 4 and the machine tool 5 which can be set in the parameter setting list information, the following can be given. However, it is not necessary to include all the following information items in the parameter setting list information.

Parameters about maximum speed, acceleration and jerk of fast feed of a feed axis Parameters about acceleration and jerk of cutting feed of the feed axis A parameter about overlap of operations of a plurality of feed axes at the time of fast feed or cutting feed Parameters about acceleration and jerk of a main axis A parameter about tolerance at the time of cutting feed Other parameters desired to be changed according to machining request information The appropriate values for the parameters may be set in the parameter setting list information as described above or may be calculated using a function with values specified in the machining content information 62c and the machining request information 62d as arguments. However, the method for deciding the appropriate values is not limited to the above methods if values of the parameters can be decided based on the values specified in the machining content information 62c and the machining request information 62d.

Examples of information read from the machining content information 62c as information used for decision of the parameter values, the following can be given. The information is not limited to the information below if the information is used to set the parameter values.

Information about mass of a loaded work piece loaded on a table driven by the numerical controller 4 and the machine tool 5

Information about mass of a tool to attached to a main axis

Decision of a function to be used and setting of parameters according to the machining content information 62c and the machining request information 62d are performed by the above process.

Figure 8:
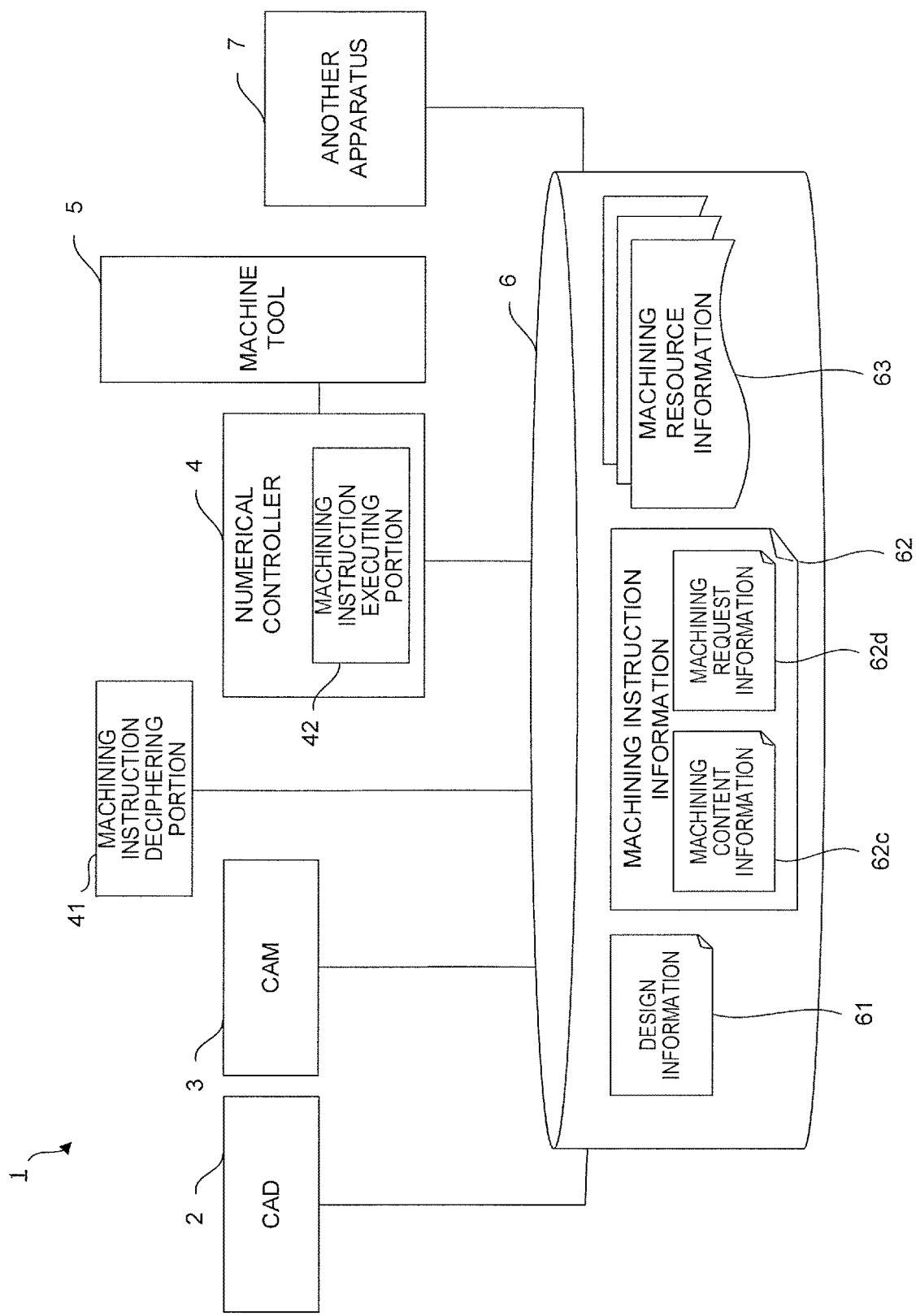
FIG. 8 is a schematic functional block diagram showing another form of the CAD/CAM-CNC integrated system.

As a modification of the CAD/CAM-CNC integrated system 1, the machining instruction deciphering portion 41 can be configured to operate on another piece of hardware such as a PC or a host computer connected to the shared database device 6 and the numerical controller 4 via a network, without being included in the numerical controller 4. Further, such a form is also possible that the machining instruction deciphering portion 41 is implemented on one of a plurality of numerical controllers 4 managed by the CAD/CAM-CNC integrated system 1, and the machining instruction deciphering portion 41 implemented on the numerical controller 4 is used from the other numerical controllers 4. FIG. 8 is a diagram showing a schematic configuration of the CAD/CAM-CNC integrated system 1 according to the present modification.

According to the above modification, it becomes unnecessary to incorporate the machining instruction deciphering portion 41 in each numerical controller 4, and it becomes possible to cause processes for deciphering a machining instruction by a plurality of numerical controllers 4 and machine tools 5 to be performed, for example, by the machining instruction deciphering portion 41 provided on one PC. Therefore, it is possible to reduce costs for construction of the CAD/CAM-CNC integrated system 1.

Figure 9:
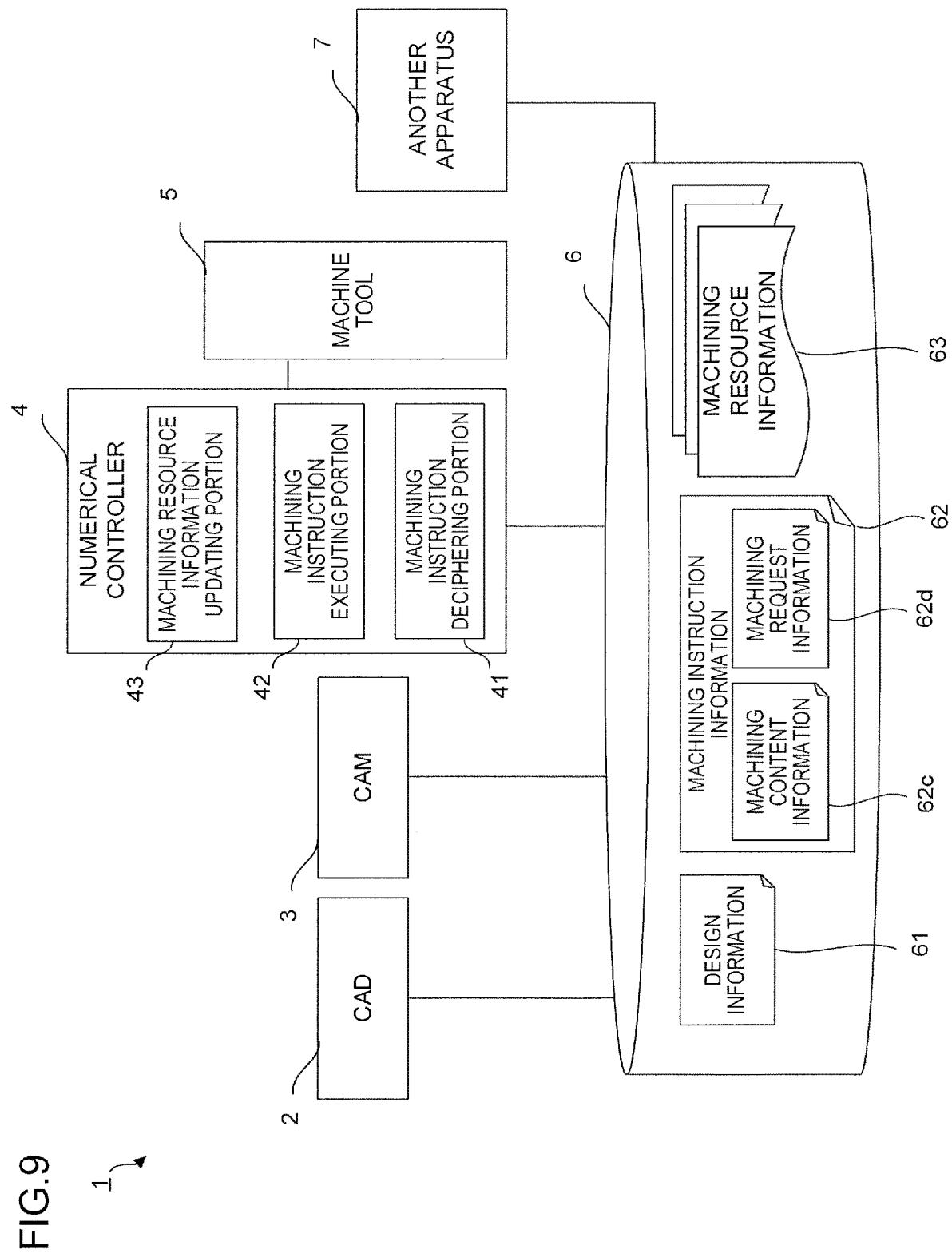
FIG. 9 is a schematic functional block diagram showing still another form of the CAD/CAM-CNC integrated system.

As another modification of the CAD/CAM-CNC integrated system 1, it is conceivable to provide a configuration for updating the machining resource information 63 stored in the shared database device 6 according to latest states of the numerical controller 4 and the machine tool 5. By automatically updating the machining resource information 63 when a change is made in the numerical controller 4 and the machine tool 5 automatically or by an operator, it becomes possible to always keep the machining resource information 63 up to date. FIG. 9 is a diagram showing a schematic configuration of the CAD/CAM-CNC integrated system 1 according to the present modification. The numerical controller 4 managed by the CAD/CAM-CNC integrated system 1 of the present modification is provided with a machining resource information updating portion 43 which detects a change automatically or manually made in settings for the numerical controller 4 and the machine tool 5 and updates the machining resource information 63 stored in the shared database device 6 as necessary.

Figure 10:
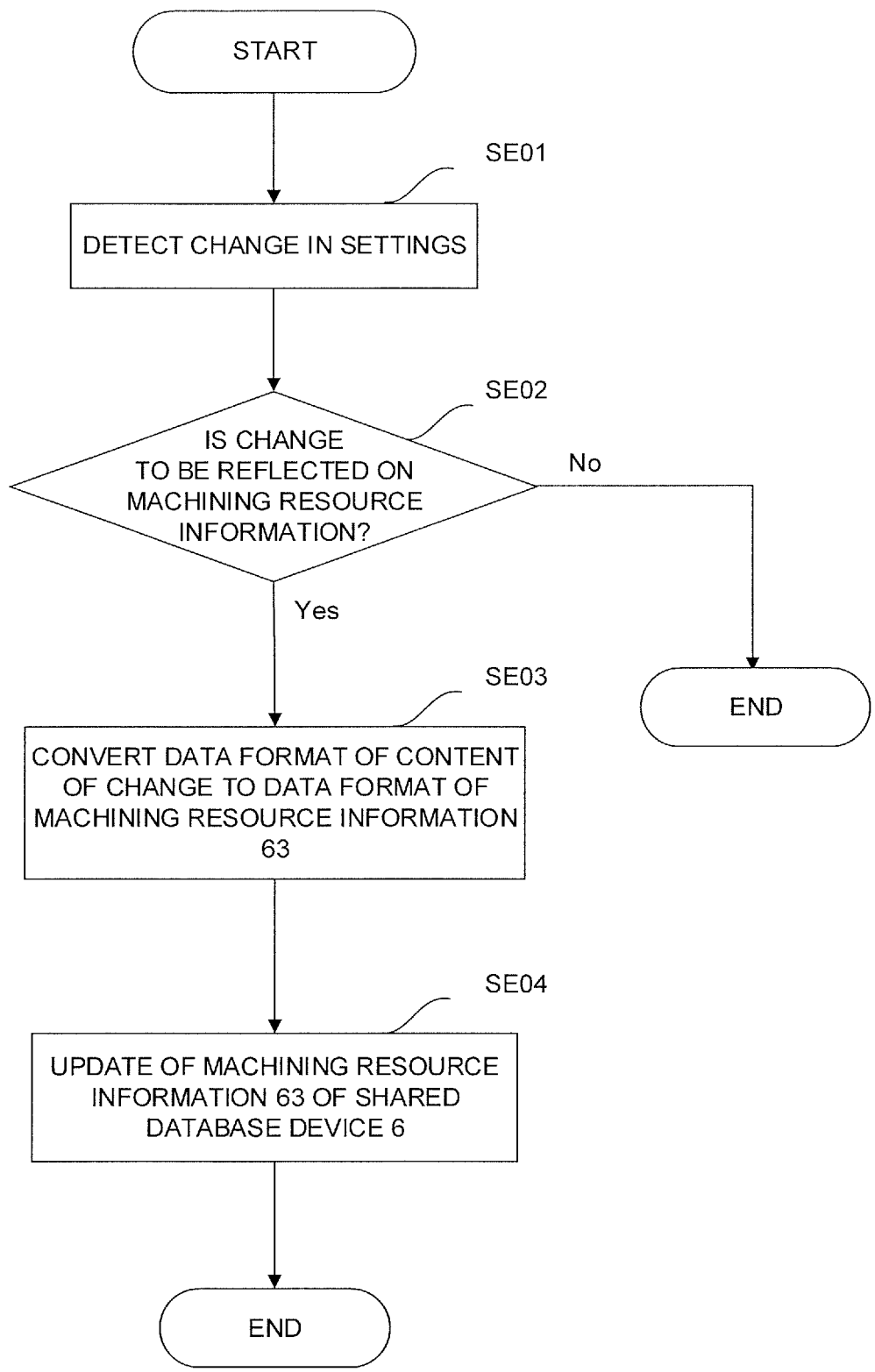
FIG. 10 is a schematic flowchart showing a form of a machining resource information update process.

FIG. 10 is a flowchart showing an example of a machining resource information update process. If detecting that a change has been automatically or manually made in settings for the numerical controller 4 and the machine tool 5 (step SE01), the machining resource information updating portion 43 judges whether it is necessary to reflect the detected change on the machining resource information 63 stored in the shared database device 6 (step SE02). If it is judged that it is necessary to perform update, the machining resource information updating portion 43 converts a data format of the setting information about the numerical controller 4 and the machine tool 5 to a data format of the machining resource information 63 as necessary (step SE03). Then, the machining resource information updating portion 43 communicates with the shared database device 6 and updates the machining resource information 63 with the information converted to the data format of the machining resource information 63 (step SE04).

It is desirable that the machining resource information updating portion 43 updates the machining resource information 63 at a timing immediately after a change is made in the settings for the numerical controller 4 and the machine tool 5. However, the machining resource information updating portion 43 may periodically detect a change in the settings and update the machining resource information 63 or may detect a change in the settings and update the machining resource information 63 at a timing of receiving an external trigger.

According to the above modification, since settings for the numerical controller 4 and the machine tool 5 are kept in almost latest states, it becomes unnecessary to incorporate the machining instruction deciphering portion 41 in each numerical controller 4 in real time, and it becomes possible to cause processes for deciphering a machining instruction by a plurality of numerical controllers 4 and machine tools 5 to be performed, for example, the machining instruction deciphering portion 41 provided on one PC. Therefore, it is possible to reduce costs for construction of the CAD/CAM-CNC integrated system 1.

As another modification of the CAD/CAM-CNC integrated system 1, the CAD/CAM-CNC integrated system 1 may be adapted to cope with a case where machining performed by one machining program is such that a plurality of machining processes are executed. In machining performed commonly, even in the case of machining performed by one machining program, tools to be used and matters required for the machining may differ according to parts to be machined or machining stages such as rough machining and finishing machining. Therefore, it is desirable that machining instruction information 62 handled in the CAD/CAM-CNC integrated system 1 is written such that machining request information 62d is associated with machining content information 62c about a shape of a part to be machined and a machining method.

In order to make a description clearly showing a relation between the machining content information 62c and the machining request information 62d, it is conceivable to write a machining instruction using a data model with a hierarchical structure in which continuous machining is divided into a plurality of machining steps according to processes, and the machining content information 62c and the machining request information 62d are written as elements of each step.

Figure 11:
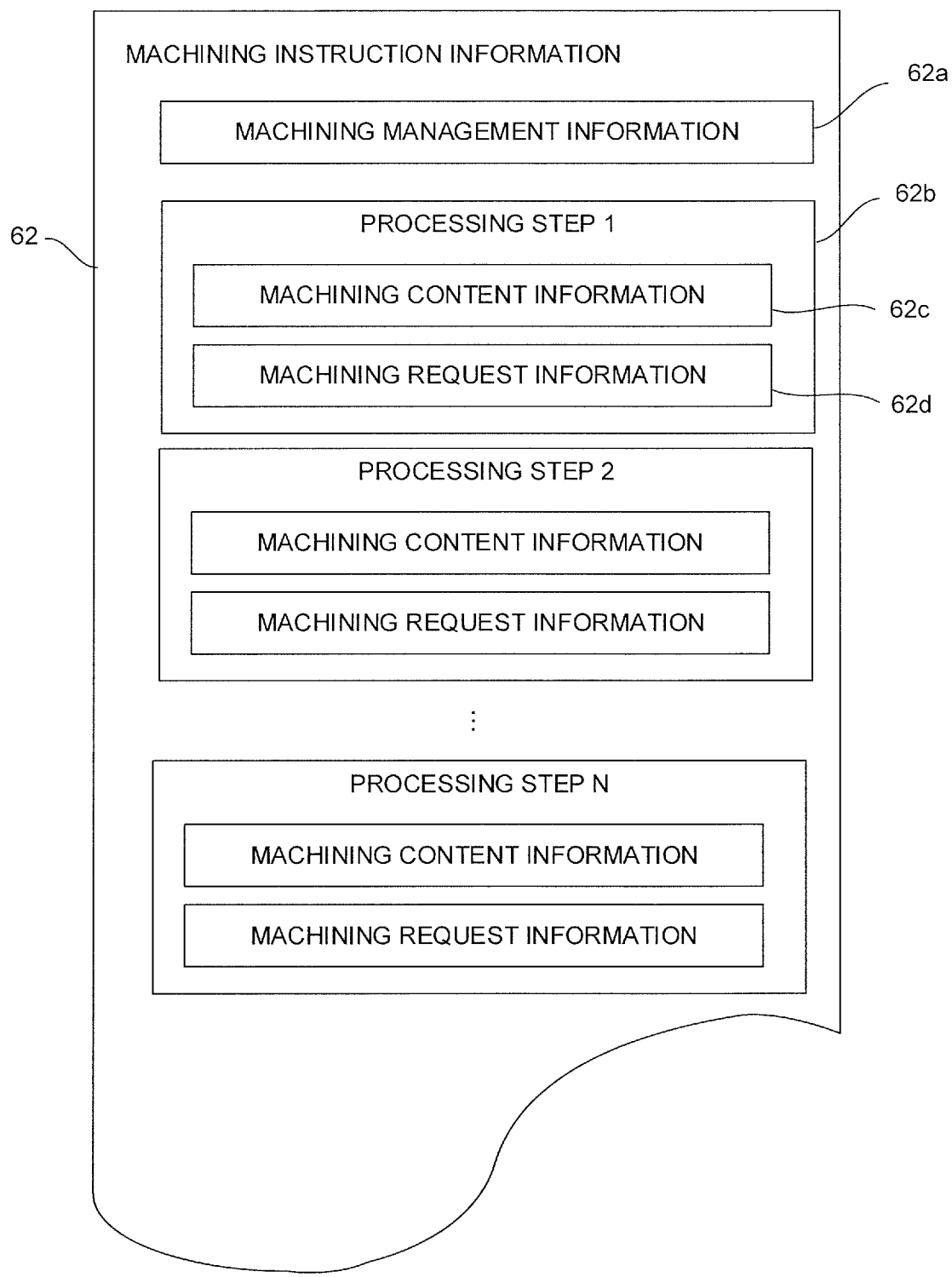
FIG. 11 is a diagram showing machining instruction information using a hierarchical structure.

FIG. 11 shows a configuration of machining instruction information 62 using a hierarchical structure. The machining instruction information 62 is configured with machining management information 62a which manages the whole machining and one or more machining steps 62b. In the machining management information 62a, information about initialization of machines, execution order of the machining steps 62b and setting information common to all the machining steps 62b are written. Each of the machining steps 62b is configured with the machining content information 62c and the machining request information 62d described above.

As an example of an existing machining instruction having a hierarchical structure, the STEP-NC standard in conformity with ISO14649 is conceivable. However, any format can be adopted as a format of the machining instruction information 62 if the format is such that description with a hierarchical structure is possible.

According to the above modification, it is possible to provide a CAD/CAM-CNC integrated system 1 which can cope with a case where machining performed by one machining program is such that a plurality of machining processes are executed.

Figure 12:
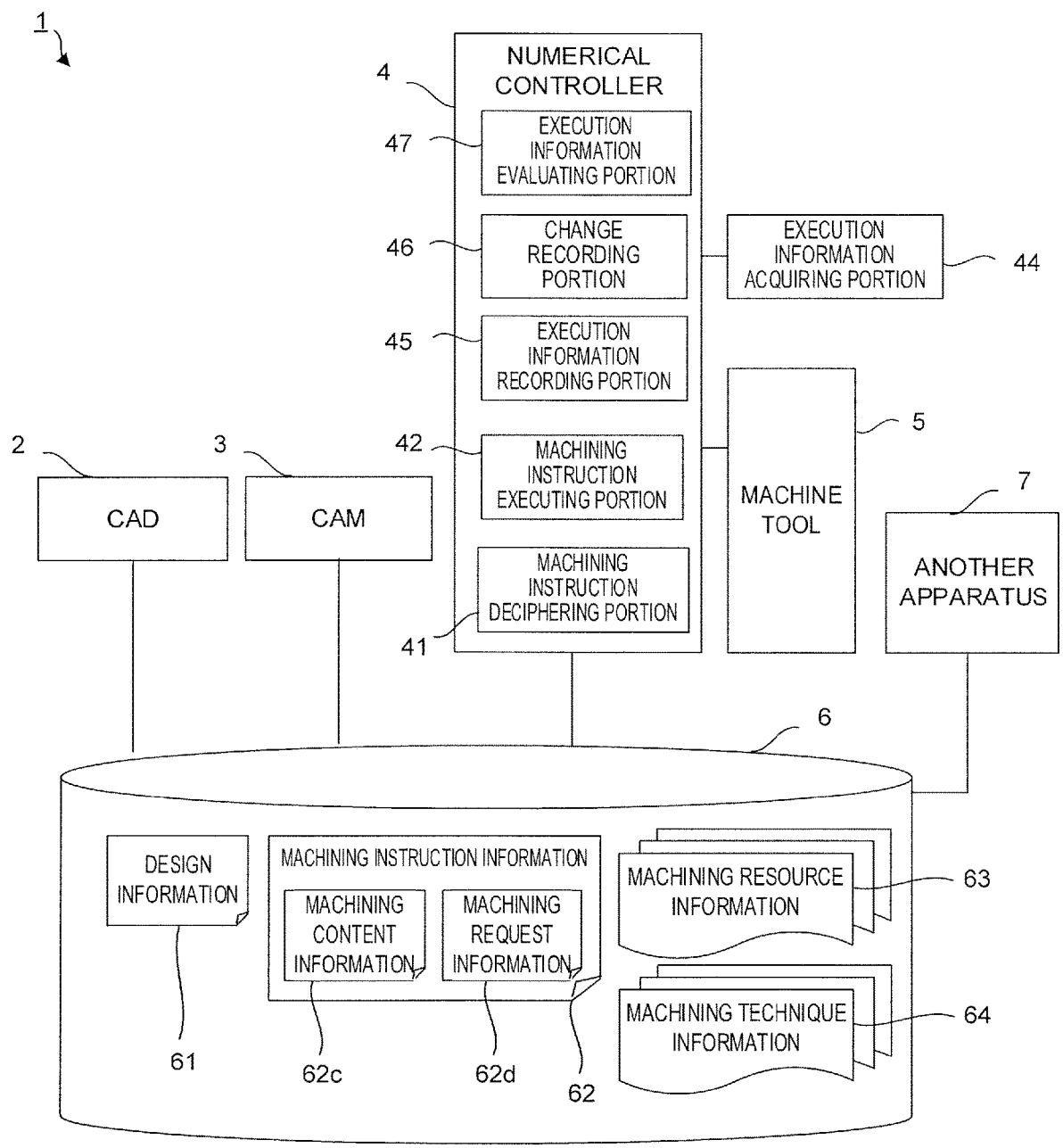
FIG. 12 is a schematic functional block diagram of a control apparatus according to a second embodiment.

FIG. 12 is a diagram showing a schematic configuration of a CAD/CAM-CNC integrated system 1 according to a second embodiment. In addition to the components of the CAD/CAM-CNC integrated system 1 shown in the first embodiment, the CAD/CAM-CNC integrated system 1 according to the present embodiment is provided with an execution information acquiring portion 44 which acquires execution information about machining in the machining, an execution information recording portion 45 which records the execution information to the shared database device 6 in association with the machining instruction information 62, a change recording portion 46 which records a change made in the machining instruction information 62 to the shared database device 6 as change information, and an execution information evaluating portion 47 which evaluates the execution information acquired by the execution information acquiring portion 44. Further, in the CAD/CAM-CNC integrated system 1 according to the present embodiment, the other apparatus 7 used in a process of designing or manufacturing a product may output measurement information about machining. The shared database device 6 which the CAD/CAM-CNC integrated system 1 according to the present embodiment is provided with stores machining technique information 64 created by analyzing the machining instruction information 62, the execution information at the time of machining, the change information and the measurement information outputted by the other apparatus 7.

As examples of the execution information at the time of machining acquired by the execution information acquiring portion 44, the following are given. However, it is not necessary that the execution information acquiring portion 44 acquires all the following information items as the execution information.

Measurement information about a current, voltage, torque, the number of revolutions, temperature of a motor of the machine tool 5 during machining Measurement information about vibration, generated sound and temperature of the machine tool 5 during machining Measurement information about pressure, a flow rate and pH of cutting fluid or air during machining Other information which can be measured by the numerical controller 4 and the machine tool 5, or the other apparatus 7 connected to the shared database device 6.

As examples of the other information which can be measured by the numerical controller 4 and the machine tool 5, or the other apparatus 7 connected to the shared database device 6, measurement information about voltage or current applied to an electrode is given if the machine tool 5 is a machine for electric discharge machining, and measurement information about laser output or water pressure is given if the machine tool 5 is a machine for laser machining or water jet machining. Further, if the machine tool 5 is an injection molding machine, measurement information about temperature or injection pressure is given as an example.

Further, as examples of the measurement information obtained from the other apparatus 7, the following are given. However, the measurement information is not limited to those shown below if the measurement information is measured as information about machining.

Measurement information about shape accuracy, geometrical accuracy and machining surface quality of a machined work piece Information about breakage and abrasion states of tools Furthermore, examples of the machining technique information 64, the following pieces of information are given. However, it is not necessary to include all the following pieces of information.

Information in which a machining condition is associated with measurement information about accuracy or quality of a machined work piece when machining is performed under the machining condition (The machining condition includes a function used for the machining and information about the parameters for the numerical controller 4 and the machine tool 5 during the machining.)

A machining condition and measurement information about machining resources when machining is performed under the machining condition (As examples of the measurement information about machining resources, information about motor temperature and power consumption of a CNC machine tool and information about abrasion and lives of tools are given.)

Figure 13:
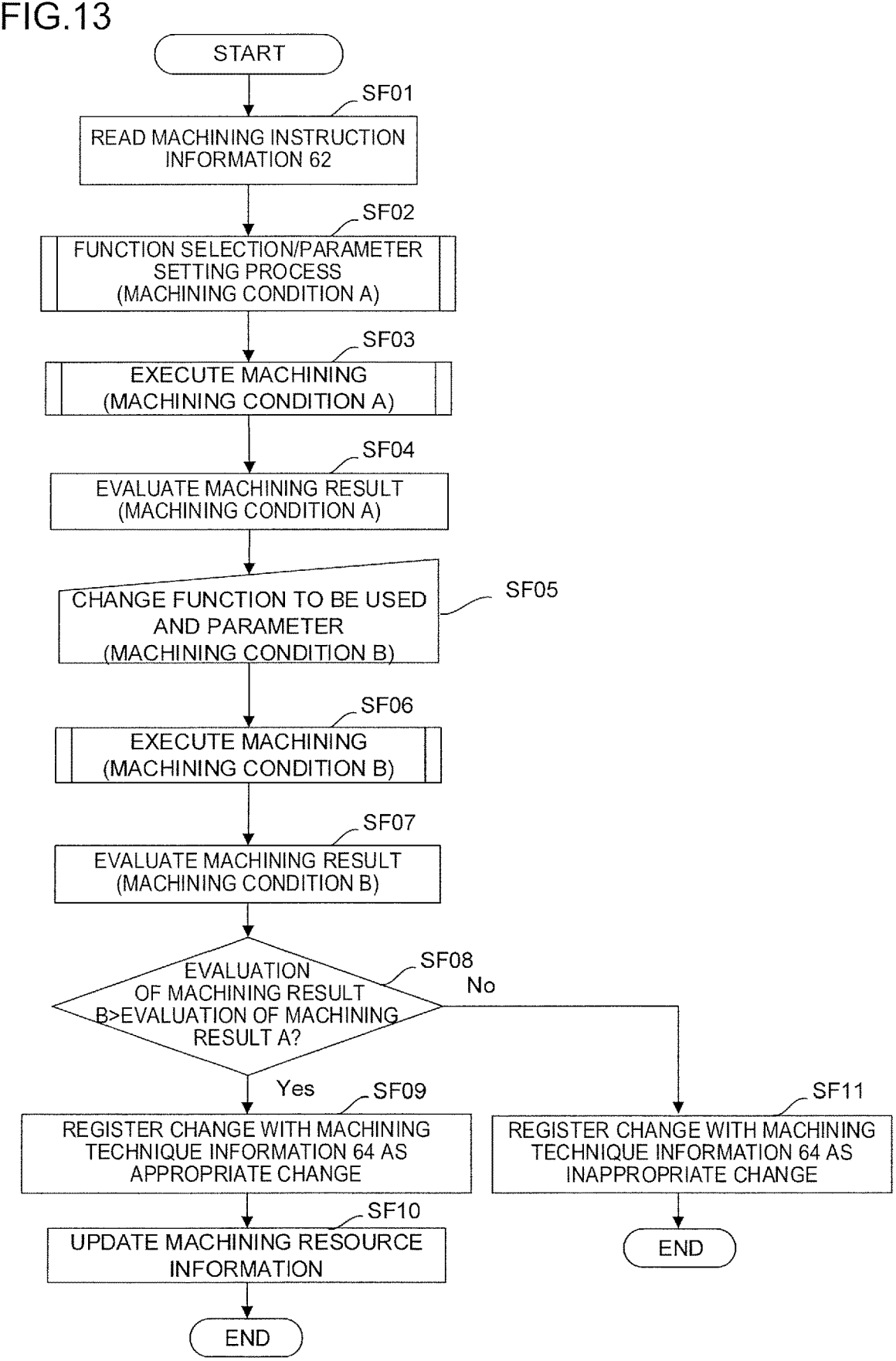
FIG. 13 is a flowchart showing a form of a process using machining technique information.

FIG. 13 is a flowchart showing an example of a process using the machining technique information 64. First, the process described with reference to FIGS. 2 and 3 and the like is executed based on the machining instruction information 62, and at least a function to be used or machine parameters are automatically decided (steps SF01 and SF02).

The function to be used and the machine parameters decided here are referred to as a machining condition A. In the numerical controller 4 and the machine tool 5, machining is performed under the machining condition A (step SF03), and the execution information acquiring portion 44 acquires machining execution information (machining execution information A) at that time and measurement information (measurement information A) outputted by the other apparatus 7. Based on the machining execution information A and the measurement information A, the execution information evaluating portion 47 evaluates whether a machining result (a machining result A) under the machining condition A satisfies a request in the machining instruction information 62. As for the evaluation of the machining result, an evaluation that machining is impossible may be given if a criterion requested by the machining instruction information 62 is not satisfied, and, if the criterion is satisfied, a higher evaluation may be given to a result which is more appropriate for a purpose. Though the evaluation of a machining result may be automatically performed by the execution information evaluating portion 47, a worker may perform evaluation and input an evaluation result to the execution information evaluating portion 47.

Here, if some change is made in the machining condition A which has been automatically selected (step SF05; the changed machining condition is referred to as a machining condition B), content of the change is acquired by the change recording portion 46. After that, on the numerical controller 4 and the machine tool 5, machining is performed under the machining condition B (step SF06), and the execution information acquiring portion 44 acquires machining execution information (machining execution information B) at that time and measurement information (measurement information B) outputted by the other apparatus 7. Based on the machining execution information B and the measurement information B, the execution information evaluating portion 47 evaluates whether a machining result (a machining result B) under the machining condition B satisfies a request in the machining instruction information 62 (step SF07).

The execution information evaluating portion 47 compares the evaluation of the machining result A and the evaluation of the machining result B (step SF08). If the evaluation of the machining result B is higher, the execution information evaluating portion 47 judges that the change made in the machining condition is appropriate and registers the machining result B with the machining technique information 64 in association with the content of the change (step SF09 and SF10). Then, the machining resource information 63 is modified so that, afterwards, the machining condition B is selected when the same machining request information 62*d* is inputted, in the automatic selection of a function to be used and parameters described with reference to FIGS. 2 and 3.

If the evaluation of the machining result B is lower than the evaluation of the machining result A, it is judged that the change made in the machining condition is inappropriate (step SF11). In this case, modification of the machining resource information 63 is not performed.

Though the embodiments of the present invention have been described above, the present invention is not limited only to the embodiments described above but can be practiced in various aspects by making an appropriate change.

For example, though description has been made in the above embodiments on an assumption that the numerical controller 4 and the machine tool 5 are different apparatuses/machines, the technique of the present invention is applicable to a numerical control machine tool in which the apparatuses/machines are integrated.

Though the embodiments of the present invention have been described above, the present invention is not limited to the embodiments described above but can be practiced in other aspects by making an appropriate change.

The invention claimed is:

1. A numerical controller which is connected to a shared database and controls a machine tool, wherein
   the shared database stores:
   machining resource information about the numerical controller and the machine tool; and
   machining instruction information including machining content information about content of machining created by computer aided design (CAD) and computer aided manufacturing (CAM) and machining request information about at least one request required for the machining;
   the numerical controller comprises a machining instruction deciphering portion for deciphering the machining instruction information and a machining instruction executing portion for executing the machining based on a result of decipherment by the machining instruction deciphering portion; and
   the machining instruction deciphering portion executes at least, based on the machining instruction information and the machining resource information that are stored in the shared database, a process for automatically:
      selecting a machining quality function for moving the machining tool during the machining, the machining quality function being selected from among a first plurality of predetermined selectable machining quality functions associated with a machining purpose of machining quality, the selected machining quality function used by the numerical controller to move the machine tool to achieve the machining purpose of machining quality, each of the first plurality of predetermined selectable machining quality functions having a respective predetermined priority order for use to achieve the machining purpose of machining quality, and
      selecting a machining speed function for moving the machining tool during the machining, the machining speed function being selected from among a second plurality of predetermined selectable machining speed functions associated with the machining purpose of machining speed, the selected machining speed function used by the numerical controller to move the machine tool to achieve the machining purpose of machining speed, each of the second plurality of predetermined selectable machining speed functions having a respective predetermined priority order for use to achieve the machining purpose of machining speed,
   wherein the process includes:
      1) selecting the selected machining quality function that has a highest predetermined priority order among the first plurality of predetermined selectable machining quality functions or selecting the selected machining speed function that has a highest predetermined priority order among the second plurality of predetermined selectable machining speed functions,
      deciding whether the selected machining quality function or the selected machining speed function is usable,
      when the selected machining quality function or the selected machining speed function is determined usable, the selected machining quality function or the selected machining speed function is decided to be a machining quality function or a machining speed function used for machining,
      whereas when the selected machining quality function or the selected machining speed function is determined unusable, searching for another usable machining quality function or another usable machining speed function, wherein the selected machining quality function or the selected machining speed function is unusable when the selected machining quality function or the selected machining speed function is in conflict with other machine functions, when the other usable machining quality function or the other usable machining speed function can be provided, selecting a machining quality function or a machining speed function of the next highest priority, and deciding whether the machining quality function or the machining speed function of the next highest priority is usable, and when the machining quality function or the machining speed function of the next highest priority is usable, the selected machining quality function or the machining speed function of the next highest priority is decided to be the machining quality function or the machining speed function, and 2) executing machining by moving the machining tool using the selected machining Quality function or the selected machining speed function.

2. The numerical controller according to claim 1, further comprising a machining resource information updating portion automatically updating, when a change is made in a setting for the numerical controller, the machining resource information in the shared database based on content of the change in the setting.

3. The numerical controller according to claim 1, wherein the shared database is further capable of storing machining technique information;

the numerical controller comprises:

an execution information acquiring portion acquiring execution information about the machining by the numerical controller and the machine tool;

an execution information recording portion recording the execution information to the shared database in association with the machining instruction information;

a change recording portion recording a change made in the machining instruction information to the shared database as change information; and an execution information evaluating portion updating the machining technique information based on the execution information and the change information; and the machining instruction deciphering portion deciphers the machining instruction information and executes at least one of a process for judging whether the machining by the machine tool according to the machining instruction information is possible or not, based on the machining instruction information, the machining technique information and the machining resource information that are stored in the shared database, a process for deciding parameters for the machining and a process for automatically selecting a function to be used for the machining among functions provided for the numerical controller and the machine tool.

4. The numerical controller according to claim 1, wherein the machining instruction information used by the numerical controller at the time of the machining is a general-purpose instruction independent of a machine in which the machining content information and the machining request information are written in a format in conformity with a data model with a hierarchical structure.

5. A computer aided design (CAD)/computer aided manufacturing (CAM)-numerical controller (CNC) integrated system comprising a shared database, a machining instruction deciphering portion and at least one numerical controller for controlling a machine tool, wherein the shared database stores:

machining resource information about the numerical controller and the machine tool; and machining instruction information including machining content information about content of machining created by CAD and CAM and machining request information about at least one request required for the machining, the machining instruction deciphering portion deciphers the machining instruction information and executes at least, based on the machining instruction information and the machining resource information that are stored in the shared database, a process for automatically selecting a machining quality function for moving the machining tool during the machining, the machining quality function being selected from among a first plurality of predetermined selectable machining quality functions associated with a machining purpose of machining quality, the selected machining quality function used by the numerical controller to move the machine tool to achieve the machining purpose of machining quality, each of the first plurality of predetermined selectable machining quality functions having a respective predetermined priority order for use to achieve the machining purpose of machining quality, and selecting a machining speed function for moving the machining tool during the machining, the machining speed function being selected from among a second plurality of predetermined selectable machining speed functions associated with the machining purpose of machining speed, the selected machining speed function used by the numerical controller to move the machine tool to achieve the machining purpose of machining speed, each of the second plurality of predetermined selectable machining speed functions having a respective predetermined priority order for use to achieve the machining purpose of machining speed, the machining resource information contains a functional information which cannot be used in combination with the machining functions, the process includes:

1) selecting the selected machining quality function that has a highest predetermined priority order among the first plurality of predetermined selectable machining quality functions or selecting the selected machining speed function that has a highest predetermined priority order among the second plurality of predetermined selectable machining speed functions, deciding whether the selected machining quality function or the selected machining speed function is usable, when the selected machining quality function or the selected machining speed function is determined usable, the selected machining quality function or the selected machining speed function is decided to be a machining quality function or a machining speed function used for machining, whereas when the selected machining quality function or the selected machining speed function is determined unusable, searching for another usable machining quality function or another usable machining speed function, wherein the selected machining quality function or the selected machining speed function is unusable when the selected machining quality function or the selected machining speed function is in conflict with other machine functions, when the other usable machining quality function or the other usable machining speed function can be provided, selecting a machining quality function or a machining speed function of the next highest priority, and deciding whether the machining quality function or the machining speed function of the next highest priority is usable, and when the machining quality function or the machining speed function of the next highest priority is usable, the selected machining quality function or the machining speed function of the next highest priority is decided to be the machining quality function or the machining speed function, and 2) executing machining by moving the machining tool using the selected machining quality function or the selected machining speed function, and the numerical controller comprises a machining instruction executing portion for executing the machining based on a result of decipherment by the machining instruction deciphering portion.

6. The CAD/CAM-CNC integrated system according to claim 5, further comprising a machining resource information updating portion automatically updating, when a change is made in a setting for the numerical controller, the machining resource information in the shared database based on content of the change in the setting.

7. The CAD/CAM-CNC integrated system according to claim 5, wherein the shared database is further capable of storing machining technique information;

the CAD/CAM-CNC integrated system comprises:

an execution information acquiring portion acquiring execution information about the machining by the numerical controller and the machine tool;

an execution information recording portion recording the execution information to the shared database in association with the machining instruction information;

a change recording portion recording a change made in the machining instruction information to the shared database as change information; and an execution information evaluating portion updating the machining technique information based on the execution information and the change information; and the machining instruction deciphering portion deciphers the machining instruction information and executes at least one of a process for judging whether the machining by the machine tool according to the machining instruction information is possible or not, based on the machining instruction information, the machining technique information and the machining resource information that are stored in the shared database, a process for deciding parameters for the machining and a process for automatically selecting a function to be used for the machining among functions provided for the numerical controller and the machine tool.

8. The CAD/CAM-CNC integrated system according to claim 5, wherein the machining instruction information used by the numerical controller at the time of the machining is a general-purpose instruction independent of a machine in which the machining content information and the machining request information are written in a format in conformity with a data model with a hierarchical structure.

* * * * *